Figure 1:
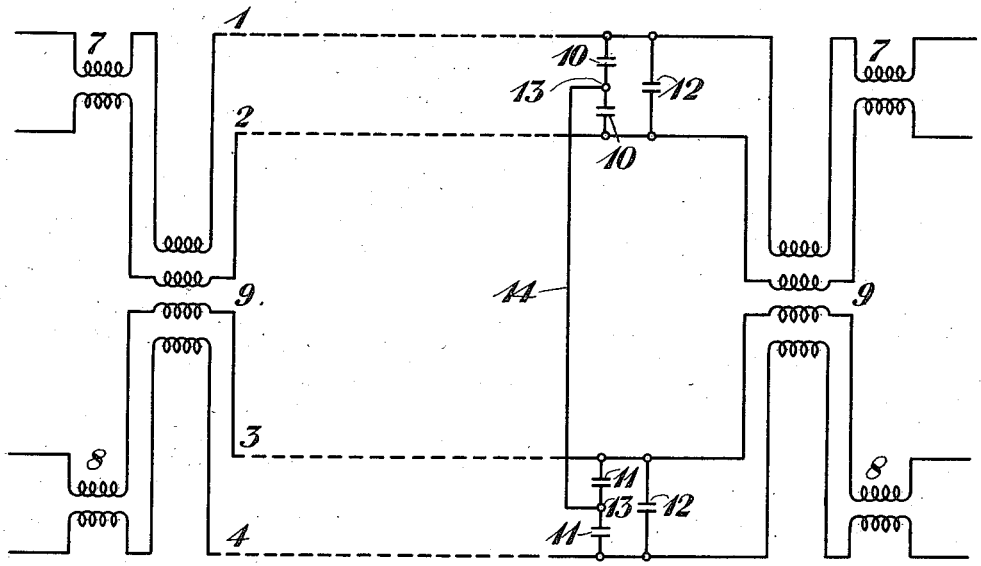

T. SHAW.
METHOD AND MEANS FOR CORRECTING IRREGULARITIES IN LOADED LINES.
APPLICATION FILED AUG. 16, 1917.

1,322,634. Patented Nov. 25, 1919.

INVENTOR.
Thomas Shaw
BY Thomas D. Lockwood
ATTORNEY

UNITED STATES PATENT OFFICE.

THOMAS SHAW, OF HACKENSACK, NEW JERSEY, ASSIGNOR TO AMERICAN TELEPHONE AND TELEGRAPH COMPANY, A CORPORATION OF NEW YORK.

METHOD AND MEANS FOR CORRECTING IRREGULARITIES IN LOADED LINES.

1,322,634.   Specification of Letters Patent.   Patented Nov. 25, 1919.

Application filed August 16, 1917. Serial No. 186,613.

*To all whom it may concern:*

Be it known that I, THOMAS SHAW, residing at Hackensack, in the county of Bergen and State of New Jersey, have invented certain Improvements in Methods and Means for Correcting Irregularities in Loaded Lines, of which the following is a specification.

This invention relates to loaded phantom transmission systems for the transmission of telephonic currents and more particularly it relates to means for equalizing the loading sections in phantomed four-wire lines and for correcting transmission irregularities therein due to differences in loading sections. Its object is to provide means whereby loading sections, whose characteristics are different, shall be rendered electrically similar, in other words to provide means for rendering the loading uniform.

It is well known to those acquainted with the art that irregularities in loaded lines are highly objectionable and very considerably reduce the advantages accruing from the employment of loading coils. Irregularities not only increase the attenuation and give rise to reflectional losses but also render it very difficult to balance the line impedance with artificial lines in two-way repeater circuits, thereby limiting the amount of amplification possible without repeater "singing."

Loading irregularities may be of two kinds: first, irregularities of the loading coils and second, irregularities of the line. It is the latter type of irregularity whose correction is the object of the present invention. Line irregularities may be due to differences in the actual length of loading sections; that is the distance between consecutive loading coils, or may be due to different distributed line constants in the conductors of the different sections.

Practical conditions often make it very difficult to construct a loaded line system having the required uniformity of loading necessary for the best repeater operation and the correction of irregularities by actual physical reconstruction may be very expensive. It is therefore desirable to provide means for rendering the loading sections electrically uniform and equal without having recourse to physical reconstruction of the line or relocation of the loading coils.

In practice the loading sections are electrically short, and the distributed inductance of each line section is small compared with the inductance of a loading coil so that line irregularities appear in practice as differences in the line capacity per loading section. If therefore, the capacities of the different loading sections are made equal, the line will behave electrically like a uniformly loaded line although the various sections may differ widely in physical length and characteristics. In my present invention I provide for electrical uniformity of loading by inserting condensers in the irregular sections so proportioned with reference to the capacity of the normal section and the irregular section, that the resultant capacity of the irregular section is equal to that of the normal section.

In phantomed systems it is necessary that the means correcting loading section irregularities in the side circuits shall be neutral with respect to and introduce no irregularity in the phantom circuit; conversely the means correcting loading section irregularities in the phantom circuit shall introduce no irregularity in the side circuits.

Figure 2:
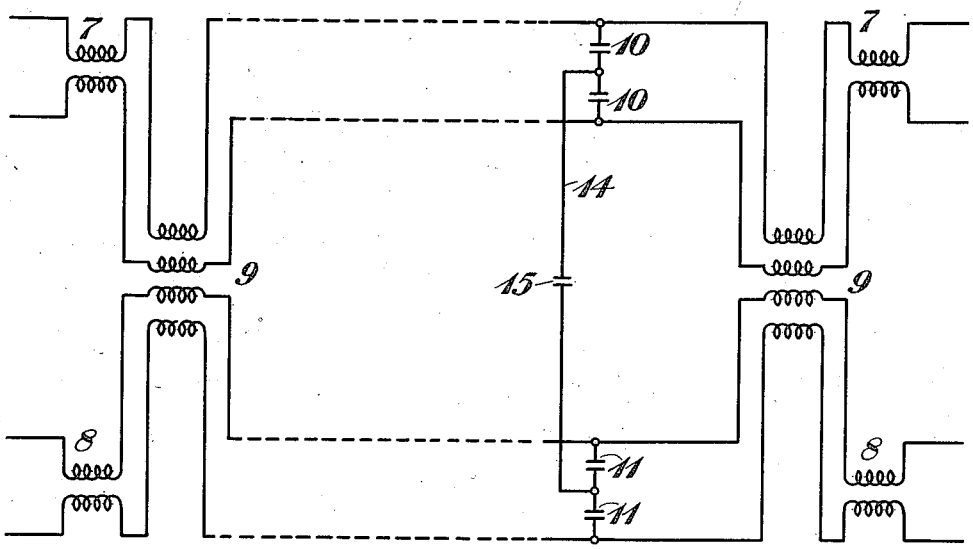

My invention is best understood by reference to the accompanying drawing in which Figure 1 is a diagram illustrating a phantom transmission system embodying one form of my invention, and Fig. 2 is a modification. Similar reference characters indicate corresponding parts through the drawing.

Referring to Fig. 1 of the drawing, a transmission line including a phantom circuit is shown, comprising four parallel conductors 1, 2, 3 and 4, conductors 1 and 2 constituting one side circuit and conductors 3 and 4 constituting the other side circuit, while conductors 1 and 2 in multiple and conductors 3 and 4 in multiple form the two sides of the phantom circuit. Loading coils 7 provide inductive loading for side circuit 1—2; coils 8 provide loading for side circuit 3—4, and coils 9 for the phantom circuit. The arrangement of loading coils shown is well known to the art, and my invention is not limited in its application to any particular arrangement of phantom loading.

The loading section shown is assumed, for purposes of illustration, to be short as regards both side and phantom circuits.

The capacity of each side circuit in this section may be represented by $C'_s$ and the capacity of the phantom circuit by $C'_p$; while $C_s$ and $C_p$ denote the capacities of normal side and phantom sections respectively. In order to correct for this condition I may, as shown in Fig. 1, connect two similar and equal capacities 10 in series across side circuit 1—2, and two like capacities 11 in series across side circuit 3—4. The pairs of capacities will also, in general be similar and equal electrically to each other. The neutral points 13 produced by this arrangement of the capacities 10 and 11 are connected by a conductor 14. A third capacity is bridged across each of the side circuits as indicated at 12. In this form of the invention the four capacities 10, 11, are of such value as to supply the deficiency in the phantom circuit, but do not fully compensate for the deficiency of the side circuits, the additional capacity necessary for this purpose being supplied by capacities 12.

If "$a$" denotes the value of capacities 10 and 11 and "$b$" that of capacities 12 it will be seen that the capacity introduced into each side circuit by the arrangement of Fig. 1, is $\tfrac{1}{2}a + b$ or $\dfrac{a+2b}{2}$ and the capacity introduced into the phantom circuit is $2a \div 2$ or $a$. If now these capacities are to supply the defect $C_p - C'_p$, of the phantom circuit as well as the defect $C_s - C'_s$ of each side circuit it is evident that $$\frac{a+2b}{2} = C_s - C'_s$$

or $$a + 2b = 2(C_s - C'_s) \quad (1)$$

and that $$a = C_p - C'_p \quad (2)$$

whence $$b = C_s - C'_s - \frac{C_p}{2} + \frac{C'_p}{2} \quad (3)$$

It will be seen therefore that with the arrangement shown both the side and phantom circuits may be properly "built out" by correctly proportioning the capacities 10, 11 and 12 and that the proper value for each may be readily determined by means of equations 2 and 3 from the known capacities of the loading sections.

In the modification shown in Fig. 2 the capacities 12 paralleling the pairs of condensers 10—10 and 11—11 are omitted and a capacity 15 is inserted in the conductor joining the neutral points between the capacities 10 and the capacities 11, otherwise the elements shown correspond to those bearing similar numerals in Fig. 1. If "$e$" denotes the value of capacities 10 and 11 in this arrangement and "$f$" the value of capacity 15 it will be seen that the capacity here introduced into each side circuit is $\dfrac{e}{2}$ and that introduced into the phantom circuit is $\dfrac{ef}{e+f}$. Again using $C_s$, $C'_s$ and $C_p$, $C'_p$ to denote the capacities of normal and deficient loading sections of the side and phantom circuits respectively, as in discussing Fig. 1 it will be apparent that $$\frac{e}{2} = C_s - C'_s$$

or $$e = 2(C_s - C'_s) \quad (1)$$

and that $$\frac{ef}{e+f} = C_p - C'_p \quad (2)$$

whence $$f = \frac{2(C_p - C'_p)(C_s - C'_s)}{2(C_s - C'_s) - (C_p - C'_p)} \quad (3)$$

From equations 1 and 3 therefore the proper value for capacities 10, 11 and 15 may be computed so as to give the desired capacity to both the side and phantom circuits, as in the modification shown in Fig. 1.

Since the values of "$a$," "$b$," "$e$" and "$f$" as used above are necessarily positive it is obvious from the equations that the invention is only applicable to sections having a defect rather than an excess of capacity, and when there is a large number of irregular sections in the line it may therefore be desirable to select that of largest capacity as the "normal" section to which the others are to be adjusted, but if desired sections of excessive distributed capacity may be converted into short sections by inserting additional loading coils and these then corrected as above indicated. This latter method would commend itself where the line was regular except for one or two sections of excessive capacity.

It will be understood by those skilled in the art that each of the capacities 10, 11, 12 and 15 may in actual practice be made up of a number of condensers in series. For instance when it is required that the units withstand a 6000 volt test it is customary to construct the condenser in series units separately built to withstand a 2000 volt test, because of practical considerations of efficiency and economy in construction.

Each of the specific forms of the invention herein disclosed employs a conductor, 14, which, it will be observed, is neutral with respect to each of the side circuits but which constitutes, with the two pairs of capacities 10 and 11, a shunt across the phantom circuit. In this respect the invention differs from that disclosed in Fig. 3 of the patent to Mills and Hoyt, 1,219,760, March 20, 1917, where an arrangement of six condensers for building out a phantomed circuit is shown. This characteristic of the invention is of value when it is desired to add resistance or inductance to the phantom circuit without affecting the side circuits and will be found advantageous in the construction of duplex basic net-work units.

It is to be understood that the modifications here described in detail are illustrative only as other variations will readily suggest themselves which come within the spirit of the invention and the scope of the appended claims.

What I claim and desire to secure by Letters Patent is:

1. The method of correcting for irregularities in the sections of loaded transmission lines having side circuits and phantom circuits which consists in arranging part of the necessary impedance so as to form neutral points between the conductors of one of the two kinds of circuits, joining said neutral points to complete a shunt connection across the other kind of circuit, including said impedance, and correcting the defect remaining in either kind of circuit by connecting additional impedance into it individually.

2. The method of building out irregular sections in loaded transmission lines having side circuits and phantom circuits, which consists in adding sufficient impedance to correct the irregularity in one of the two kinds of circuits in such form as to provide a neutral point in each side circuit, connecting the neutral points thus provided, and correcting the remaining deficiency in the other kind of circuit by impedance added exclusively thereto.

3. The method of correcting for irregularities in the sections of loaded transmission lines having side circuits and phantom circuits which consists in arranging a part of the necessary impedance in shunt across both phantom and side circuits with at least two impedance elements in series in whichever circuit the shunt be considered and correcting the irregularity then remaining in either phantom or side circuits by impedance connected in a shunt affecting only such circuit or circuits.

4. The method of building out irregular sections in loaded transmission lines having side circuits and phantom circuits which consists in providing a shunt for the conductors of the line, one part of which shunt is common to both phantom and one side circuit, a separate part of which shunt is common to both phantom and another side circuit, connecting a portion of the necessary impedance in said common parts of the shunt and completing the correction by impedance affecting only the circuit or circuits in which a deficiency then remains.

5. In a transmission line the combination with pairs of conductors constituting side circuits and a phantom circuit, of loading coils in said conductors dividing the side circuits and phantom circuit into sections, and means for correcting irregularities in said sections, including a plurality of impedance devices, one for each pair of conductors, and having its terminals bridged across the said pair and a common connection uniting the midpoints of said devices and with said devices constituting a shunt across the phantom circuit.

6. A building out unit for loaded transmission lines having side circuits and phantom circuits, comprising a group of impedances each connected at one side to one of the conductors of the line, a connection uniting the other sides of said impedances and with them constituting a shunt across the phantom circuit, and supplementary impedance connected in shunt across one of the two aforesaid kinds of circuits.

7. A building out unit for correcting at once irregularities in both phantom circuit and side circuits of loaded transmission lines, comprising a pair of impedances connected in series across each side circuit, a common connection uniting the pairs at their middle points, said impedances being of a value to fully correct the section as to one of the two kinds of circuits, and means located exclusively in the other kind of circuit to correct for the remaining irregularity without affecting the first named correction.

8. A unit for correcting the impedance of a transmission line having a plurality of pairs of conductors, said unit comprising pairs of conductors connected across each pair and impedances connected across each pair and arranged to provide a point neutral thereto, said impedances having values dependent upon the difference between the correct and the actual values of the impedance of the line, and an electrical connection uniting said neutral points.

9. A unit for correcting the capacity of a transmission line having a plurality of pairs of conductors, said unit comprising capacities connected across each pair and arranged to provide a point neutral thereto, said capacities having values dependent upon the difference between the correct and the actual values of the capacity of the line, and an electrical connection uniting said neutral points.

10. A building out unit for phantomed transmission lines, comprising a pair of capacities connected in series across each side circuit, a conductor joining said pairs of capacities at their middle points and additional capacities shunted across the side circuits.

In testimony whereof, I have signed my name to this specification this thirteenth day of August 1917.

THOMAS SHAW.